United States Patent
Kmiec et al.

(10) Patent No.: US 11,437,159 B2
(45) Date of Patent: Sep. 6, 2022

(54) PASSIVE HEAT REMOVAL CASKS AND METHODS OF USING THE SAME

(71) Applicant: GE-Hitachi Nuclear Energy Americas LLC, Wilmington, NC (US)

(72) Inventors: Christopher P. Kmiec, Wilmington, NC (US); Earl F. Saito, Wilmington, NC (US); Eric Paul Loewen, Wilmington, NC (US); David L. Major, Wilmington, NC (US); Shirly Rodriguez Rojas, Wilmington, NC (US); Kenneth E. Karcher, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 42 days.

(21) Appl. No.: 17/120,097

(22) Filed: Dec. 11, 2020

(65) Prior Publication Data

US 2021/0225542 A1    Jul. 22, 2021

Related U.S. Application Data

(60) Provisional application No. 62/946,901, filed on Dec. 11, 2019.

(51) Int. Cl.
*G21F 5/10* (2006.01)
*G21F 5/06* (2006.01)

(52) U.S. Cl.
CPC . *G21F 5/10* (2013.01); *G21F 5/06* (2013.01)

(58) Field of Classification Search
CPC ..................................... G21F 5/10; G21F 5/06
(Continued)

(56) References Cited

U.S. PATENT DOCUMENTS

| 6,802,671 B1 | 10/2004 | Badie et al. |
| 9,865,365 B2 | 1/2018 | Bang et al. |

(Continued)

FOREIGN PATENT DOCUMENTS

| EP | 0403756 | 12/1990 |
| JP | 2009-168775 | 7/2009 |
| KR | 200228725 | 7/2001 |

OTHER PUBLICATIONS

Arifff et al. "Fuel Transfer Cask; Procedure Option and Radiation Protection During Transferring the Spent Fuel" 2020.

(Continued)

*Primary Examiner* — Nicole M Ippolito
(74) *Attorney, Agent, or Firm* — Ryan Alley IP

(57) ABSTRACT

Casks shield materials and passively remove heat via heat transport paths from deep inside to outside the cask. The transport path may be heat pipes and conductive rods that are non-linear so that radiation is always shielded by the cask. A damper may surround an end of the heat transport path to control heat loss from the cask. A jacket of fluid or meltable material that conducts heat by convection may surround stored materials ensure an even temperature within the cask, and the heat transport path may absorb heat from the jacket. Casks are useable to safely store, transport, and dispose of any sensitive or heat-generating material. Casks may be opened or closed to simultaneously load and offload materials at a consistent operating temperature provided by heaters in the cask.

17 Claims, 2 Drawing Sheets

(58) Field of Classification Search
USPC ......... 250/505.1, 506.1, 507.1, 515.1, 516.1, 250/517.1, 518.1, 519.1
See application file for complete search history.

(56) References Cited

U.S. PATENT DOCUMENTS

| | | | |
|---|---|---|---|
| 2004/0200997 A1* | 10/2004 | Soundararajan | ........ G21F 1/106 524/480 |
| 2014/0177775 A1 | 6/2014 | Loewen et al. | |
| 2015/0243385 A1 | 8/2015 | Singh et al. | |
| 2020/0005956 A1* | 1/2020 | Pennington | ............... G21F 5/14 |

OTHER PUBLICATIONS

Carlsen et al. "Dry Transfer Systems for Used Nuclear Fuel" May 2012.
Iaea, "Multi-purpose container technologies for spent fuel management" Dec. 2000.
WIPO, Written Opinion of the ISA in corresponding PCT application PCT/US2020/064713, dated Jul. 8, 2021.
WIPO, Search Report of the ISA in corresponding PCT application PCT/US2020/064713, dated Jul. 8, 2021.

* cited by examiner

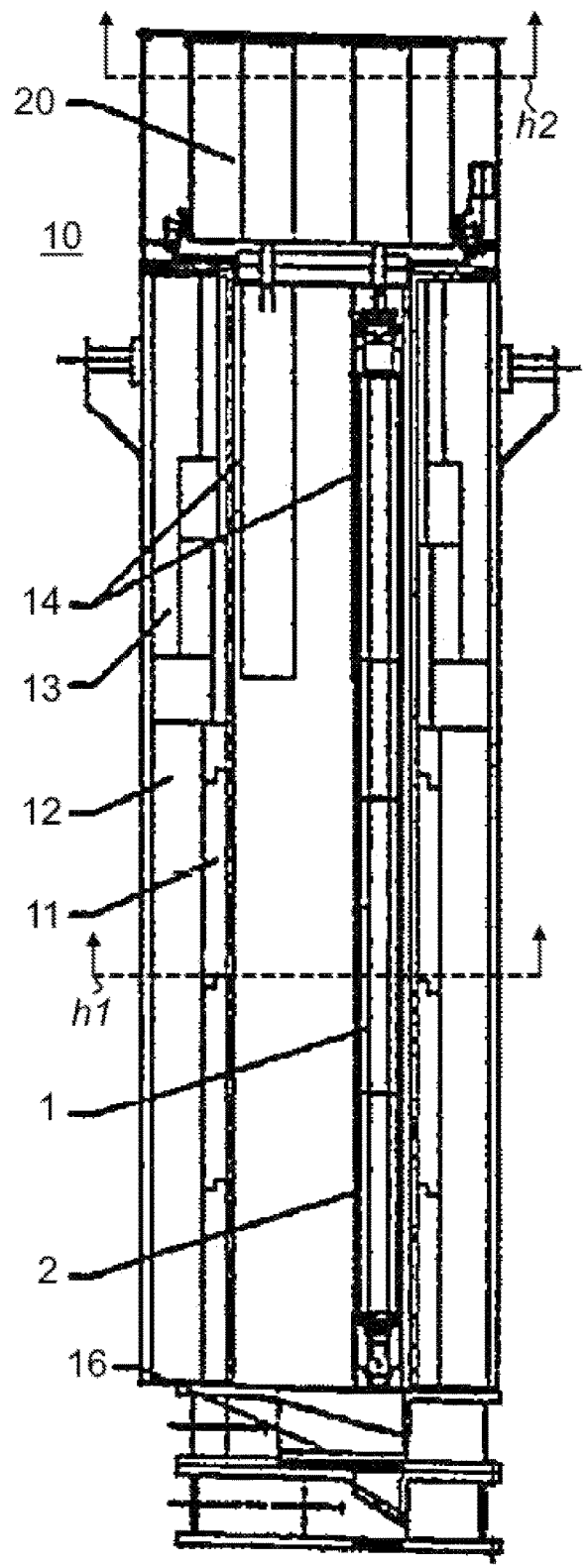
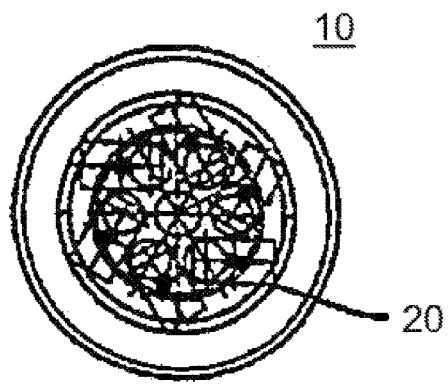
FIG. 1B
(Related Art)
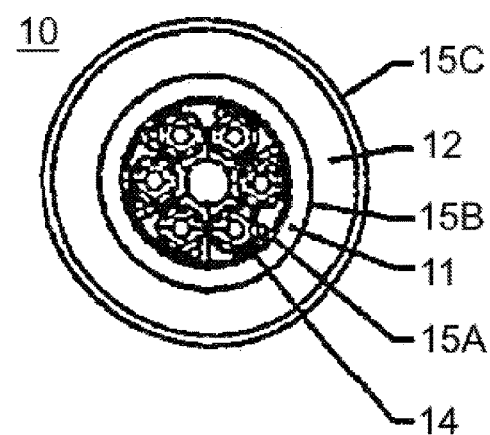
FIG. 1C
(Related Art)
FIG. 1A
(Related Art)

PASSIVE HEAT REMOVAL CASKS AND METHODS OF USING THE SAME

RELATED APPLICATIONS

This application claims priority under 35 U.S.C. § 119 to U.S. Provisional Application 62/946,901, filed Dec. 11, 2019 and incorporated by reference herein in its entirety.

BACKGROUND

FIG. 1A is a cross-section of a related art transfer cask 10 used for storing heat-generating waste, including radioactive materials like spent nuclear fuel and irradiated waste. As shown in FIG. 1, cask 10 includes inner shielding 11 and outer shielding 12 that define a central open space into which fuel assembly 1 and handling basket 2 may be inserted and stored. Inner shielding 11 may be depleted uranium that maintains structural containment and blocks radiation emitted by contents of cask 10. Outer shielding 12 may be a thicker boron carbide jacket that provides further impact shielding and particularly neutron radiation shielding. Retaining sleeve 14 at a top of the cavity within this shielding may align and keep positioned fuel assembly 1 during insertion and storage, as well as allow for indexing and removal of the same. The cavity inside inner shielding 11 may be backfilled with helium to keep the heat-generating contents chemically static while avoiding large pressure differentials across cask 10. Drip pan 16 may catch liquid or solid debris that falls from stored contents. FIG. 1C is a cross-section of related-art cask 10 at elevation line h1, showing inner shielding 11 as a ring jacketed by outer shielding 12. Several reinforcing dividers 15A, 15B, and 15C, which may be high-strength stainless steel, divide and reinforce the shielding and form an outer surface of cask 10.

Void 13 at a top of cask 10 may connect up to bi-stem assembly 20 at the top end of cask 10. Active pumps and fluid recirculators may connects through bi-stem assembly 20 into void 13 to actively cool and move heat away from contents of cask 10. As seen in FIG. 1B, taken as a cross-section at elevation line h2, bi-stem assembly 20 may allow for handling of cask 10, such as through a crane or other connection to assembly 20. With proper ambient conditions and active cooling provided to cask 10, high-energy contents that generate large amounts of heat through radiation may be stored and transported for long periods of time without damaging cask 10 or irradiating the environment. US Patent Publication 2014/0177775 published Jun. 26, 2014 Loewen et al. describes another related art cask for spent nuclear fuel with active cooling devices to also dissipate cask heat and is incorporated by reference herein in its entirety.

SUMMARY

Example embodiments include casks that passively rid themselves of heat that may be generated by their contents, with shielding around the contents to stop alpha, beta, gamma, or neutron radiation from leaking to the surrounding environment and one or more heat transport paths that allow the heat to easily move from inside the cask and shielding to outside the cask and ultimately into the environment or an external heat sink. The transport path may be any structure with high heat convection, conduction, and/or radiation, sufficient to prevent internal temperatures from reaching damaging temperatures, including heat pipes and conductive rods. The heat transport path may be bent or otherwise provide no straight line from inside to outside the cask, so that radiation travelling along such a line always hits shielding. An openable and closeable damper may surround an end of the heat transport path to control fluid convection about the heat transport path and ultimately heat loss from the cask. A jacket of fluid or meltable material that conducts heat by convection may surround the stored materials ensure an even temperature within the cask. The heat transport path and/or a heating element may be in communication with the jacket to cool and/or heat the jacket as desired.

Example embodiment casks are useable to store, transport, and dispose of any sensitive or heat-generating material without damaging buildup of heat or irradiation. This may include radioactive waste, irradiated components, spent or fresh nuclear fuel, etc. Casks may be opened or closed to simultaneously load and offload materials at a consistent operating temperature provided by heaters in the cask. Several fuel assemblies and other highly radioactive structures can be placed and stored in casks without risk of melting or loss of containment due to the passive heat removal from the cask.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

FIG. 1A is a cross-section of a related art fuel transport cask.

FIG. 1B is a cross-section of the cask of FIG. 1A.

FIG. 1C is another cross-section of the cask of FIG. 1A.

DETAILED DESCRIPTION

Figure 2A:
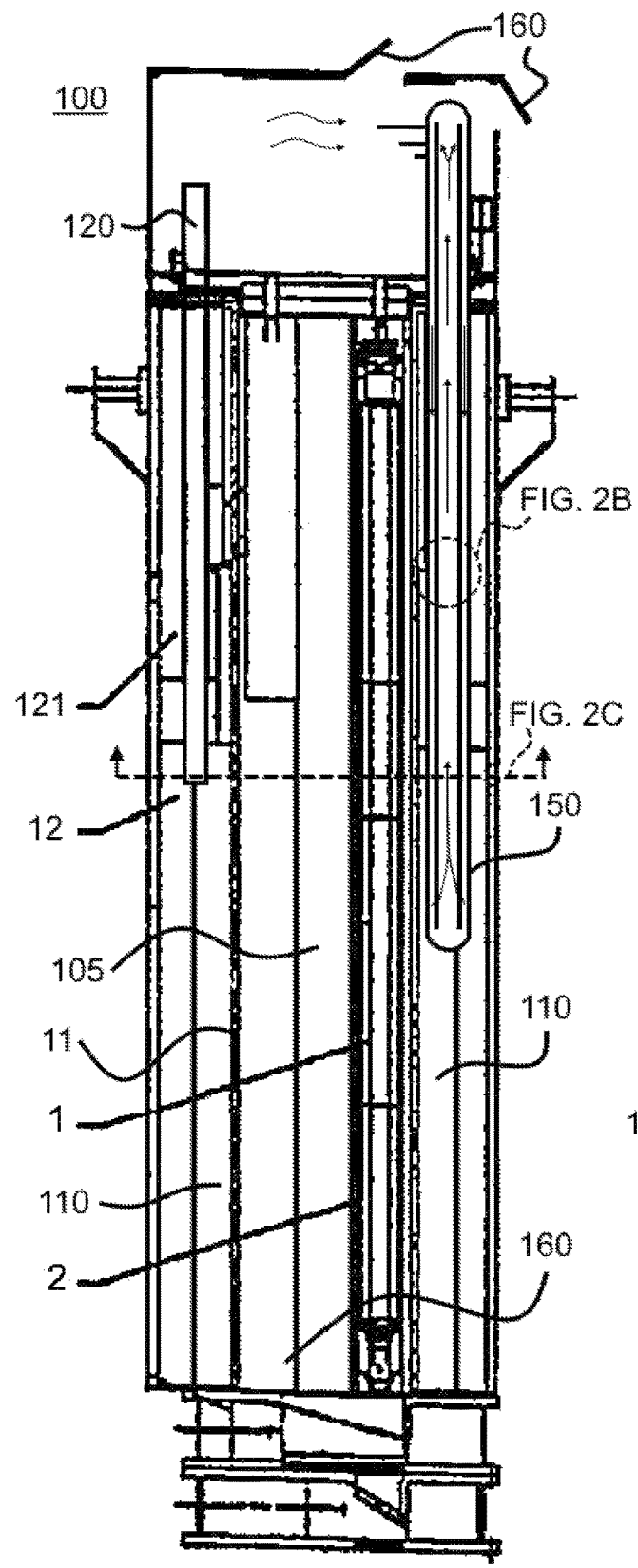
FIG. 2A is a profile cross-section of an example embodiment example transfer cask.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

Modifiers "first," "second," "another," etc. may be used herein to describe various items, but they do not confine modified items to any order or relationship. These terms are used only to distinguish one element from another; where there are "second" or higher ordinals, there merely must be that many number of elements, without necessarily any difference or other relationship between elements. For example, a first element could be termed a second element, and, similarly, a second element could be termed a first element, unless an order or difference is separately stated. In listing items, the conjunction "and/or" includes all combinations of one or more of the associated listed items. The use of "etc." is defined as "et cetera" and indicates the inclusion of all other elements belonging to the same group of the preceding items, in any "and/or" combination(s).

When an element is related, such as by being "connected," "coupled," "mated," "attached," "fixed," etc., to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two devices, including intermediary devices, networks, etc., connected wirelessly or not.

As used herein, singular forms like "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to the same previously-introduced term. Possessive terms like "comprises," "includes," "has," or "with" when used herein, specify the presence of stated features, characteristics, steps, operations, elements, and/or components, but do not themselves preclude the presence or addition of one or more other features, characteristics, steps, operations, elements, components, and/or groups thereof. Rather, exclusive modifiers like "only" or "singular" may preclude the presence or addition of multiple or other subject matter in modified terms. As used here, a "heat transport path" is a solid structure transferring heat at a high rate, higher than surrounding materials, without outside power or driven solid components, including conductive rods and heat pipes.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The inventors have recognized that. The inventors have developed example embodiments and methods described below to address these and other problems recognized by the Inventors with unique solutions enabled by example embodiments.

The present invention is. In contrast to the present invention, the few example embodiments and example methods discussed below illustrate just a subset of the variety of different configurations that can be used as and/or in connection with the present invention.

FIG. 2A is a profile cross-section of an example embodiment heat transfer cask 100 using a heat transport path that passively removes heat from the contents of the cask. Cask 100 may have some similar configurations to related art casks discussed above or shown in FIGS. 1A-C, with heat transport elements added as described below and structural and shielding elements made of strong, non-reactive materials. Example embodiment heat transfer cask 100 is robust and seals with the integrity of containment, and, as such is useable to store, transport, and dispose of dangerous or sensitive material, including radioactive components and nuclear material, without risk of leakage, reaction, or damage when exposed to force or harsh environments.

As shown in FIG. 2A, in example embodiment heat transfer cask 100, heat transport path 150 directly connects an inner portion of cask 100 to an exterior or near exterior, to carry heat directly away from cask 100 without any solid moving part. For example, a first end of heat transport path 150 may extend deep into shielding, including inner shielding 11 and even a cavity holding heat-generating stored objects, such as spent nuclear fuel 1. An opposite end of heat transport path 150 may pass to an outer portion, such as outer damper 160 or even to an exterior of cask 10, to be in direct communication with the environment.

Figure 2B:
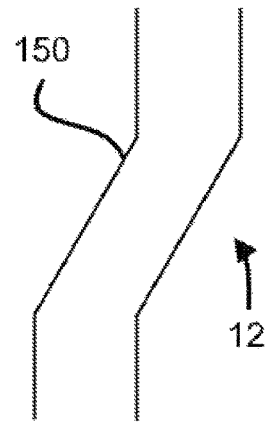
FIG. 2B is a detail of the heat transport path of the cask of FIG. 2A.

FIG. 2B is a detail of heat transport path 150 from FIG. 1A, showing a directional change in path 150 to avoid a direct, linear path from inside example embodiment heat transfer cask 100 to the surrounding environment. Because path 150 may be fully shielding, differently shielding, or not necessarily shielding at all, a straight line from a radiation producing stored element, such as spent fuel 1, to outside cask 100 may provide an exposure path through which dangerous or unwanted radiation may escape. To prevent or reduce such irradiation outside cask 10, path 150 may change direction, such as via lateral jog in FIG. 2B through surrounding outer shielding 12, to remove any straight path through radiation shielding of cask 100. Flow path 150 may curve, angle, bend, etc. in any number of different directions to prevent any escape line from inside cask 100 to outside the same. Additionally or alternatively, flow path 150 may incorporate shielding materials or be shielded at ends to further prevent radiation escape.

Figure 2C:
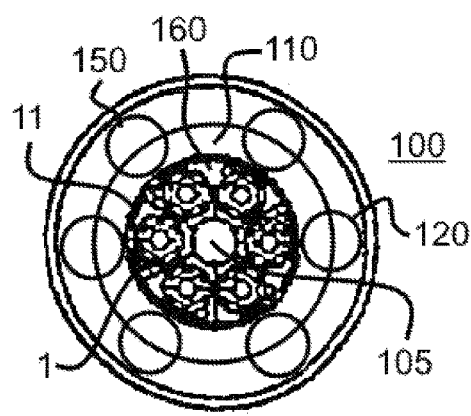
FIG. 2C is a cross-section of the cask of FIG. 2A

Heat transport path 150 readily transmits heat between its portions near an inside of cask 100 and outside cask 100. For example, as shown in FIG. 2C, heat transport path 150 may be a solid, heat conductive rod such as copper, iron, tungsten, aluminum, and/or conductive alloys such as aluminum nitride or silicon carbide. As shown in FIG. 2A, heat transport path 150 may be a heat pipe with an internal transport path conducting heat via convection and conduction through an evaporating and condensing coolant. Any number of heat transport paths 150 may be used in example embodiments, necessary only to remove expected heat loads. For example, sufficiently sized and numbered heat transport paths 150, such as 20 1 kW heat pipes, may be used to ensure temperatures do not exceed or even approach 650° C. based on the radioactivity of objects placed into cask 100. Heat transport path 150, like other structural elements of cask 100, is fabricated of materials that are sufficiently strong to preserve the structural integrity of cask 100 while not undergoing substantial strength or material changes or degradation when exposed to radiation, including stainless steels, aluminum alloys, nickel alloys, zirconium alloys, carbides, etc. In this way, heat transport path 150 may readily allow heat to passively escape cask 100 while ensuring cask 100 is robust and maintains containment to radioactive elements inside, without external power or moving structures.

Example embodiment heat transfer cask 100 may include dampers 160 at a cooling or ambient portion of heat transport path 150. For example, dampers may form a skirt or ring about a perimeter of an end of cask 100, or be placed anywhere else about heat transfer path 150. Dampers 160 may be manually or automatically opened to allow air flow and convection over heat transfer path 150, maximizing heat transfer out of cask 100, or partially opened or closed to allow heating of cask 100.

Example embodiment heat transfer cask 100 may include a convective jacket or ring 110 that acts as a conductive heat reservoir. For example, ring 110 may be a 2-inch sodium ring that will melt and be convective liquid at typical inner temperatures of cask 100. Ring 110 may be in direct or nearby connection with a heated or innermost portion of heat transport path 150 to transfer heat to path 150, which is then transferred through path 150 to an outer portion, such as near dampers 160. Ring 110 may be between inner shielding 11 and outer shielding 12, which may be thinner than in related art casks to achieve a same outer diameter, or same or larger sizes with a different outer diameter.

Inner cavity 160 defined by shielding and internal structural dividers of example embodiment cask 100 may be sized to house any number of heat-generating materials, including as such as six fuel assemblies 1 for liquid metal reactors, light or heavy water reactors, graphite-moderated reactors, etc. Inner cavity need not be filled with helium but can use any inert filler, including argon or nitrogen, given the heat transfer abilities of cask 100. Central rod 105 may be used to pack cavity 160, absorb radiation, and/or extend from a top of cask 100 to allow handling. For example, central rod 105 may be strong boron carbide that is both a neutron absorber and is structural with the remainder of cask 100 and allows handling the same where it passes up through an end. This may limit fission possibilities in cavity 160 even when filled with several nuclear fuel assemblies 1. As shown in FIG. 2C, cavity 160 may be surrounded by a perimeter of several heat transport paths 150 as well as shielding 11/12 and ring 110, in any ordering or thickness with structural separators. In this way, cavity 160 may be evenly and fully cooled/heated by transport paths 150 and ring 110.

Example embodiment heat transfer cask 100 may include immersion heating rod 120 to heat ring 110 and contents of cavity 160 to a desired temperature. Immersion heating rods 120 may be similarly positioned to heat transport paths 150 and work in a largely opposite manner, delivering heat into, or generating heat in, cask 100. For example, immersion heating rods 120 may be electric resistant heaters with power connections 121 near a top end of casks 100 to heat rods 120 and conduct the heat down into ring 110 and/or cavity 160. Rods 120 may be staggered about a perimeter into ring 110 with heat transport paths 120, as shown in FIG. 2C, for even heating and cooling. For example, if cask 100 is used to store and transport new fuel assemblies 1 for insertion into a liquid metal reactor, it may be desirable to bring the stored components near operating temperatures over 200° C. by activating immersion heating rod 120. During such operation, damper 160 may be closed to prevent or reduce convection to a cold end of heat transport path 150, so heat is not lost from cask 100. Example embodiment heat transfer cask 100 may include a lid or seam at an end allowing insertion or removal of contents of cavity 160 during this time, and cask 100 may be kept open and at an operating temperature during all loading and unloading because it is kept at an operating temperature by immersion heating rod 120.

Some example embodiments and methods thus being described, it will be appreciated by one skilled in the art that examples may be varied through routine experimentation and without further inventive activity. For example, although casks with several annular shields are used in some example systems, it is understood that other cask configurations are useable with examples. Variations are not to be regarded as departure from the spirit and scope of the example embodiments, and all such modifications as would be obvious to one skilled in the art are intended to be included within the scope of the following claims.

What is claimed is:

1. A heat transfer cask comprising:
    shielding defining an internal cavity and limiting ionizing radiation from passing from the cavity to an environment surrounding the heat transfer cask;
    a heat transport path including a heat pipe extending from inside the shielding to outside the shielding;
    a heater to warm the cavity; and
    a convection jacket surrounding the cavity, wherein the convection jacket is configured to distribute heat evenly within the cavity, and wherein the heater extends into the convection jacket.

2. The cask of claim 1, wherein the heat transport path includes a directional change through the shielding to block the ionizing radiation.

3. The cask of claim 1, further comprising:
    nuclear material contained within the cavity, wherein the nuclear material is at least one of fresh nuclear fuel, spent nuclear fuel, radiation sources, irradiated waste, and radioactive-contaminated waste.

4. The cask of claim 3, wherein the heat transport path is configured to transport heat outside the cask so that the cavity does not exceed 650° C.

5. The cask of claim 4, wherein the heat transport path includes at least 20 1 kW heat pipes.

6. The cask of claim 1, further comprising:
    a damper enclosure at an end of the cask, wherein the heat transport path extends into the damper enclosure, and wherein the damper enclosure can be opened to enhance fluid convection about the heat transport path and closed to limit fluid convection about the heat transport path.

7. The cask of claim 1, further comprising:
    a convection jacket surrounding the cavity, wherein the convection jacket is configured to distribute heat evenly within the cavity.

8. The cask of claim 7, wherein the convection jacket contains only metal sodium configured to melt and circulate to distribute the heat evenly within the cavity.

9. The cask of claim 7, wherein the heat transport path has an end in the convection jacket.

10. The cask of claim 1, further comprising:
    a damper enclosure at an end of the cask, wherein the heat transport path extends from the convection jacket into the damper enclosure, and wherein the damper enclosure can be closed to limit fluid convection about the heat transport path when the heater is heating the convection jacket.

11. A heat transfer cask for storing nuclear material below 650° C., the cask comprising:
    shielding defining an internal cavity and limiting ionizing radiation from passing from the cavity to an environment surrounding the heat transfer cask; and
    a heat transport path having a first closed end inside the shielding to and a second closed end outside the shielding such that no fluid exits the heat transport path, wherein the heat transport path is shaped so that no straight line passes through both the first and the second ends of the heat transport path and not the shielding, and wherein the cask is fabricated only of materials configured to maintain their chemical identities when exposed to ionizing radiation from spent nuclear fuel.

12. The heat transfer cask of claim 11, wherein the heat transport path is at least one of a heat pipe and a solid conductive rod.

13. The heat transfer cask of claim 11, further comprising:
a convection jacket surrounding the cavity, wherein the heat transport path extends into the convection jacket, wherein the convection jacket is configured to melt by 200° C. and distribute heat evenly within the cavity.

14. The cask of claim 13, further comprising:
a heater to warm the cavity, wherein the heater extends into the convection jacket.

15. A method of storing nuclear fuel in a heat transfer cask including, shielding defining an internal cavity and limiting ionizing radiation from passing from the cavity to an environment surrounding the heat transfer cask, a convection jacket surrounding the cavity and configured to melt by 200° C. and distribute heat evenly within the cavity, and a heat transport path from inside the shielding into the convection jacket and to outside the shielding, the heat transport path being shaped so that no straight line internal to the heat transport path passes through both ends of the heat transport path, the cask being fabricated only of materials configured to maintain their chemical identities when exposed to ionizing radiation from spent nuclear fuel, wherein the method comprises:
loading fresh fuel from the internal cavity of the cask into a reactor; and
unloading the spent fuel or nuclear material from the reactor into the internal cavity of the cask.

16. The method of claim 15, wherein the cask is not closed during or between the loading and unloading.

17. The method of claim 15, further comprising:
activating a heater in the cask to warm the fresh fuel to at least 200° C.

* * * * *